April 30, 1968   W. W. MOYER, JR., ET AL   3,380,582
INSULATING ARTICLE AND METHOD
Filed Sept. 3, 1965   2 Sheets-Sheet 2
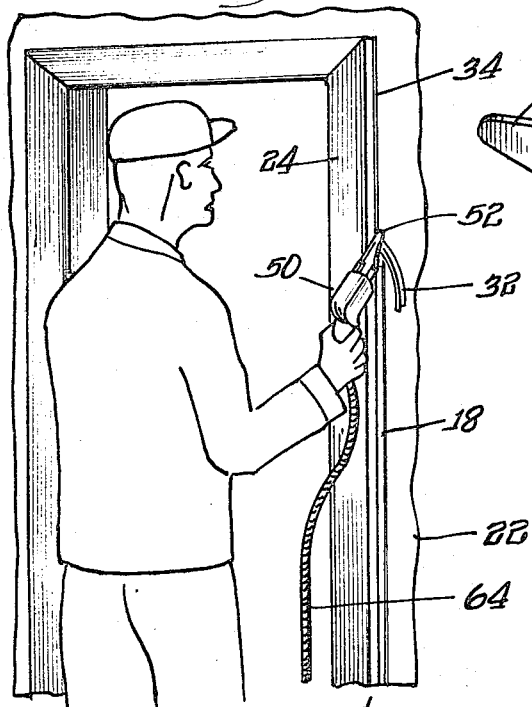
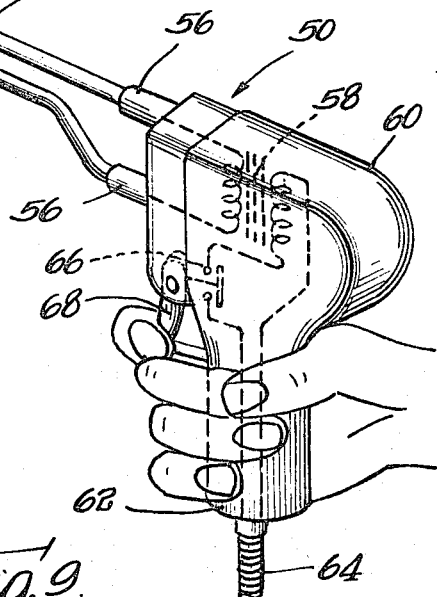
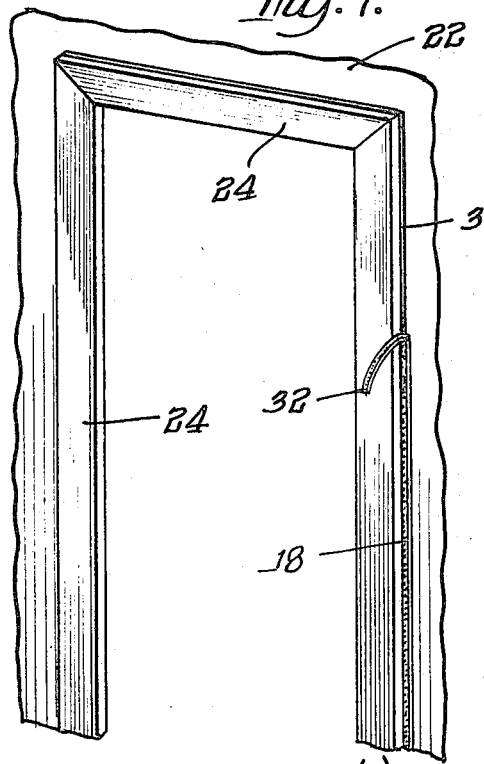
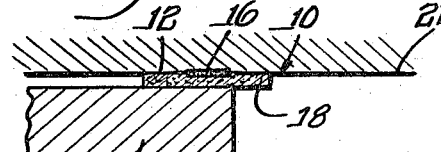
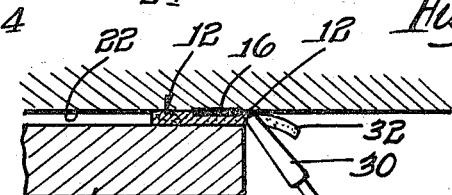
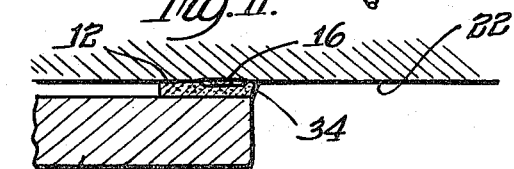
Inventors
Wendell W. Moyer
Paul J. Kochalka

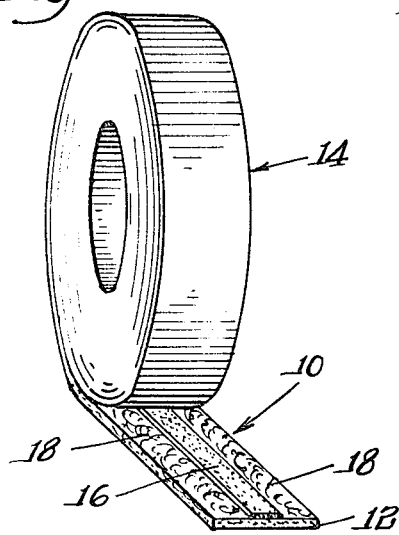
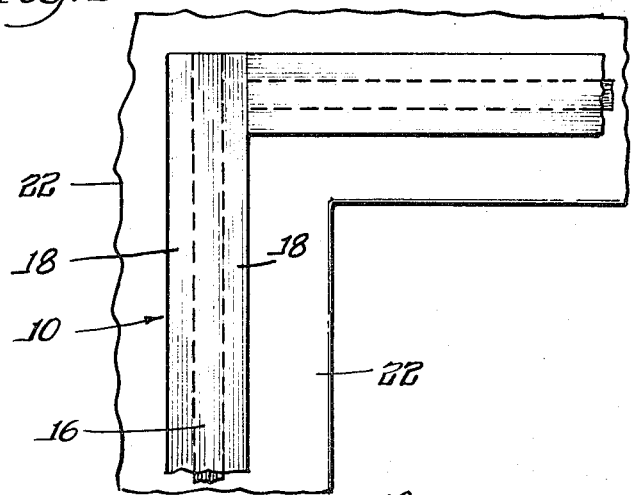
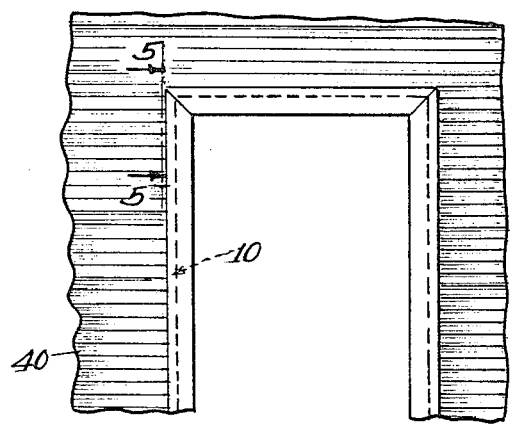
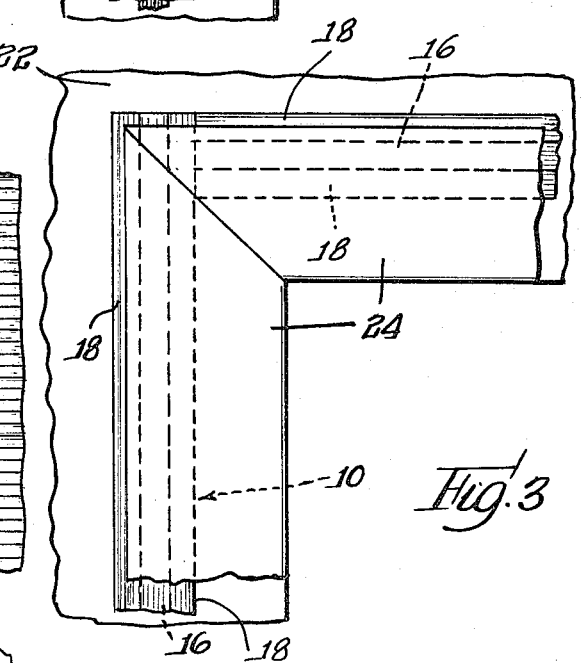
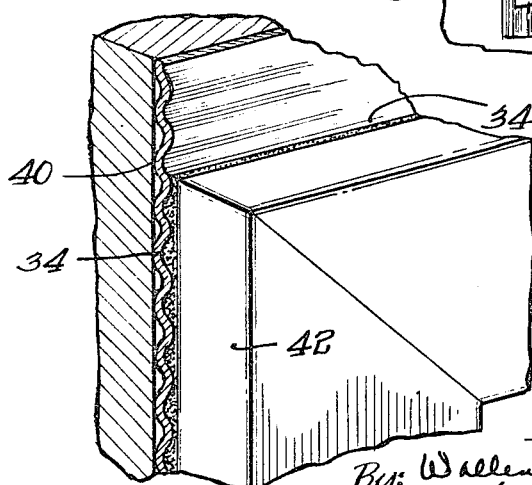

United States Patent Office 3,380,582
Patented Apr. 30, 1968

3,380,582
INSULATING ARTICLE AND METHOD
Wendell W. Moyer, Jr., Glen Ellyn, and Paul J. Kochalka,
Chicago, Ill., assignors to Daubert Chemical Company,
Oak Brook, Ill., a corporation of Illinois
Filed Sept. 3, 1965, Ser. No. 484,866
4 Claims. (Cl. 206—59)

ABSTRACT OF THE DISCLOSURE

An insulating article in roll form to be used for weather-stripping doors, windows, or the like, in conjunction with a heated knife edge or blade, comprising an elongated, flexible strip of a heat severable and fusible closed-cell type plastic material wound upon itself in the form of a roll. The strip of plastic material is adapted to be placed between structural elements to be weather-stripped and is capable of being simultaneously severed and fused when thusly placed by a heated blade, for example, at a temperature in the range of from about 200° F. to about 500° F., to provide a rigid, smooth, unbroken and weather resistant seal between the structural elements. The strip of plastic material has a thin film of an adhesive on at least one side thereof to enable the strip to be adhered to at least one of the structural elements preparatory to forming the weather-resistant seal between them.

---

The insulating article of the present invention not only has excellent heat- and cold-insulative and moisture-resistant properties, but is extremely easy and simple to handle and apply. It will not crack and will not lose its adhesion. The flexibility of the article enables it to be used in connection with substantially any type of surface, including the surfaces of corrugated materials such as are frequently employed, for example, in the manufacture of house and truck trailers. While the insulating article of this invention can be used as a sealing or weather-stripping material in existing construction, it is particularly adaptable to point of installation use. In accordance with the method aspects of the invention, the insulating article, when applied, is heat treated to provide it with a smooth, straight, unbroken, heat- and cold-insulative and moisture-resistant, tightly sealed edge which is inconspicuous and in no way detracts from the appearance of rigid structural members associated with it. This result, furthermore, is attained simply and rapidly without in any way marring, scratching, or otherwise damaging adjacent structural members. Waste and clean-up considerations are minimal.

Briefly, the objectives of the present invention are achieved with a flexible, thermoplastic material in the form of an elongated web or strip which, for convenience in handling and application, advantageously is marketed in rolls. The thermoplastic material is of the cellular or foamed type, and the web or strip formed therefrom carries a film or layer of an adhesive material on either one, or both, of its sides to enable the strip to be held in proper position with relation to rigid structural members requiring insulation or weather-stripping. As will be described more fully hereinafter, a smooth, unbroken, finished edge is provided on the exposed margin of the web or strip by means of an electrically heated knife or blade.

Other objects, advantages and features of this invention will become apparent upon making reference to the specification, claims and drawings wherein:

FIG. 1 is a view in perspective of an embodiment of the insulating article of this invention in the form of a roll;

FIG. 2 is a fragemntary front view in elevation of strips of said embodiment of the insulating article of this invention applied to a wall surface preparatory to securing the casing of a door frame thereover;

FIG. 3 is a front view in elevation corresponding to the view of FIG. 2 with the door frame casing installed preparatory to providing the article with a finished edge;

FIG. 4 is a fragmentary front view in elevation showing said embodiment of the article as used in a corrugated wall installation;

FIG. 5 is an enlarged fragmentary vtrtical sectional view taken substantially along line 5—5 of FIG. 4;

FIG. 6 is a fragmentary view in perspective showing the use of an electrically heated hand tool for providing a smooth, unbroken, tightly sealed edge to a door frame installation weather-stripped with strips of said embodiment of the installing article of this invention;

FIG. 7 is a fragmentary view in perspective of a portion of the "flashing" as it is removed from said embodiment as the operation illustrated in FIG. 6 is performed;

FIG. 8 is a view in perspective of an embodiment of an electrically heated hand tool for use in providing a finished edge to said embodiment of the article after it has been installed;

FIG. 9 is a horizontal sectional view through a door frame installation of the type shown in FIGS. 6 and 7 showing a strip of said embodiment of the insulating article in position between the wall and a casing of the door frame;

FIG. 10 is a view corresponding to the view of FIG. 9 showing the electrically heated blade of the hand tool providing a finished edge on the strip; and FIG. 11 is a view corresponding to the view of FIG. 9 showing the relationship of the finished edge of the strip to the casing and wall of the door frame installation.

Referring now to FIG. 1 of the drawings, the embodiment of the insulating article illustrated, designated generally by numeral 10, comprises an elongated web or strip 12 of a thermoplastic material wound upon itself to form a roll 14. The strip 12 has an essentially continuous, longitudinally extending layer 16 of an adhesive material provided on one side thereof. The layer 16, as shown, is positioned substantially medially of the longitudinal edges of the strip 12 to provide marginal areas 18—18 free of adhesive material. The location of the layer 16 with respect to the longitudinal edges of the strip 12 may be varied and, if desired, both sides of the strip may be provided with a layer of the adhesive material.

As indicated, the thermoplastic materials having utility for the purposes of this invention are of the type that can be formed into foams. While open-cell foams can be used in forming the web or strip 12, those of the closed-cell type are preferred. The foams advantageously should have a density at approximately 23° C. of from about 1 to about 10 lbs./cu. ft., especially desirably from about 2 to about 4 lbs./cu. ft. In addition, the thermoplastic foam used should be capable of being melted or fused by a heated knife-edge or blade to provide a tight, smooth, unbroken, draft- and moisture-resistant seal. To achieve this end within practical and safe temperature ranges, the thermoplastic materials used in forming the insulating articles of this invention advantageously should melt or fuse at a temperature of from about 200° F. to about 500° F., usually from about 250° F. to 350° F.

Exemplary of thermoplastic materials that can be used to attain the objectives of this invention are polyethylene, polypropylene, styrene resins exemplified by polystyrene, acrylic resins such as polymethylmethacrylate, vinyl resins including polyvinyl chloride and polyvinyl acetate, cellulosic resins such as cellulose acetate and cellulose acetate butyrate, nylon resins exemplified by polycaprolactam, and the like.

The dimensions of the strip 12 are variable. Generally speaking, the strip should have a length such that, when it is produced for marketing in the form of a roll, it can be handled conveniently by a workman, for example. The width of the strip, depending upon the use to which it is put, may range from less than an inch to several inches. In most instances the width of the strip will range from about 1 inch to about 6 inches, usually about 1 inch to 3 inches, more or less. The thickness of the strip may range from about $\frac{1}{16}$ inch to about $\frac{3}{8}$ inch, particularly satisfactory being strips having thicknesses in the range of about $\frac{1}{8}$ inch to about $\frac{1}{4}$ inch. While the thickness of the strip may vary appreciably from these values, if the thickness is relatively substantial the insulating article of this invention cannot satisfactorily be handled by a workman in the form of rolls.

The adhesive material utilized in forming the film or layer 16 carried by the strip 12 can be formed from a wide variety of materials. However, while water-, solvent- and heat-activatable adhesives are contemplated for use in this connection, from the standpoint of ease in handling and application, pressure-sensitive adhesives are particularly preferred. The pressure-sensitive adhesive may be selected from numerous of such commercially marketed adhesive compositions. In general, they desirably contain rubber or rubber-like materials of natural or synthetic character, illustrative examples of which comprise polyisobutylenes, polyvinyl chloride, natural gum, Buna rubbers, neoprene, butyl rubbers, polyvinyl ethers, polyacrylate esters, and the like.

The width of the film or layer 16 of the adhesive material used on the strip is variable. If only a very thin layer is employed, the entire width of the strip may be coated with the adhesive. If, on the other hand, it is desired, for some reason, to use a thicker film or layer of the adhesive material, that portion of the strip to which a heated knife-edge or blade is to be applied should be free of the adhesive material. In either event, the heated knife-edge or blade should not be contaminated with the adhesive material.

From a practical standpoint, in those instances where a thicker film or layer of the adhesive material is used on the thermoplastic strip, the width of the film or layer desirably should be less than about 50% of the width of the strip. Thus, by way of illustration, a strip having a width of from 1 to 2 inches need only be provided with a film or layer of adhesive material having a width of from about $\frac{1}{4}$ inch to $\frac{1}{2}$ inch to attain the objectives of the invention.

The thickness of the film or layer of adhesive material can be varied within reasonable limits. If a thin film, corresponding substantially to the width of the strip, is used, the thickness of the film may range from about 0.1 to about 0.5 mil, usually about 0.2 to 0.3 mil. In those embodiments of the insulating article wherein the width of the film or layer is less than about 50% of the width of the thermoplastic strip, the thickness of the film or layer may range from about 1 to 3 mils, usually about 2 mils.

The adhesive material, especially in those instances wherein a thin film or layer thereof is used to coat substantially entirely one side of the strip of thermoplastic material, advantageously is applied to the "felted" side of the strip. By thus locating the adhesive material and by controlling its tensile strength and tackiness, it is possible to roll the insulating article upon itself without the necessity for either using a release coated liner between the adhesive material carrying side of the insulating article and the opposite side or, alternatively, for applying a release coating to said opposite side of the article. A thin film having the desired tensile strength and tackiness can be formed, for example, from a composition comprising about 90 to 110 parts of natural rubber, about 20 to 30 parts of an indene resin (Piccolyte S–40, Pennsylvania Industrial Chemical Corp.) and about 830 to 850 parts of an organic solvent such as hexane. Where thicker films or layers of the adhesive material are called for, steps of the character outlined, to prevent adhesion of the adhesive material to the adhesive free side of the article, will facilitate handling and application of the insulating article. Where a release coating is used, it may be selected from various of those on the market, many of which comprise silicone based composition.

Referring again to the drawings, the steps involved in providing a tight seal between rigid structural members of various types with the insulating article of this invention are illustrated. As shown in FIGS. 2 and 3, the article 10 is adhered to a wall 22 by means of the adhesive material film or layer carried on one side of the strip 12 preparatory to placing the casing 24 of door frame thereover. The article 10 is so positioned on the wall 22 with relation to the door opening that when the casing is secured to the wall 22, over the article 10, a portion at least of a marginal area 18 of the article will extend outwardly from the outer edge of the casing. As best seen in FIGS. 9 through 11, a heated knife-edge or blade 30 is then guided along the outer edge of the casing 24 to remove the exposed portion or "flashing" 32 of the marginal area 18 of the article and to fuse the edge 34 thus formed into a smooth, unbroken, heat-, cold- and moisture-resistant state.

The flexibility of the insulating article of this invention and its ability to conform and adhere to substantially any type of surface make it especially suitable as a sealer or weather-stripping material in corrugated walled structures. This use of the article is illustrated in FIGS. 4 and 5 of the drawings. The article is first adhered to the corrugated wall 40. As seen in FIG. 5, the article conforms readily to the undulations in the wall 40. The casing 42, for example, is then fastened in position on the wall over the article. As before, a small portion or "flashing" of a marginal area of the article extends beyond the outer edge of the casing 42 and is removed with a heated knife-edge or blade which follows the contours of the wall 40. It should be understood in connection with the foregoing description that the insulating article need not be first applied to the wall but may be applied to the casing and the casing thereafter secured to the wall. The "flashing" of the article may then be removed in the manner described.

Removal of the "flashing" of the insulating article, and fusion of the thermoplastic material at the exposed edge of the article, advantageously is achieved by utilizing an electrically heated tool of the type illustrated in FIG. 8 and shown being used by a workman in FIG. 6. The tool is of the hand type, similar to an electric soldering gun, except that the operative tip is in the form of a thin blade which almost instantly heats to operating temperatures when the power is turned on, and almost instantly cools to room temperature when the power is turned off.

The heating tool 50 shown comprises a thin conductor blade 52 having two rigid electrical leads 54—54 rigidly connected thereto. The leads are clamped into terminals 56—56 of a secondary or a step-down transformer 58 mounted in a gun body 60 having a pistol grip handle 62. An electric cord 64 is provided for connecting the transformer to an A.C. voltage source. A switch 66 operated by a finger operable trigger 68 on the handle 62 is provided for turning the power off and on.

The tool has distinct advantages when used in combination with the insulating article of the present invention in that the operative tip thereof can be raised quickly to the fusion or melting temperature of the thermoplastic material and will cool quickly after it has been de-energized. No flames are present, and consequently fire hazards are greatly reduced. The heat is concentrated at the blade 52 which can be easily controlled. The blade can be guided over uneven surfaces rapidly and can always be maintained in contact with the "flashing" of the insulating article. The finished edge of the insulating article thus produced not only is smooth and unbroken, but is fused during the "flashing" removal operation to provide a tight, heat-, cold- and water-resistant seal. The insulating article seal thus formed in accordance with the practice of this invention will not crack and will not loose its adhesion. Furthermore, it will last almost indefinitely.

While for purposes of illustration one form of this invention has been disclosed other forms thereof will readily suggest themselves to those skilled in the art in the light of this disclosure and, therefore, the present invention is to be limited only by the scope of the appended claims.

What is claimed is:

1. An insulating article in roll form to be used for weather-stripping doors, windows, or the like, in conjunction with a heated knife edge or blade, comprising an elongated, flexible strip of a heat severable and fusible closed-cell type plastic material wound upon itself in the form of a roll, said strip of plastic material being adapted to be placed between structural elements to be weather-stripped and capable of being simultaneously severed and fused when thusly placed by a heated blade at temperatures in the range of from about 200° F. to about 500° F. to provide a rigid, smooth unbroken and weather resistant seal between said structural elements, and a thin film of an adhesive on at least one side of said plastic material to enable the strip to be adhered to at least one of the structural elements preparatory to forming the weather-resistant seal between them.

2. An insulating article in roll form comprising an elongated, flexible strip of a heat severable and fusible plastic foam material having a width of from about 1 to about 6 inches and a thickness of from about 1/16 to 3/8 inch, said plastic foam being characterized by having a density of from about 1 to 10 pounds per cubic foot and being capable of being simultaneously severed and fused by a heated blade at a temperature of from about 200° F. to about 500° F., and a film of pressure-sensitive adhesive on at least one side of said strip to enable the strip to be adhered to and maintained on rigid structural members preparatory to forming a draft- and moisture-proof joint between said rigid structural members with the insulating article, said film having a thickness of from about 0.1 to about 3 mils.

3. An insulating article in roll form comprising an elongated, flexible strip of a thermoplastic foam, said strip having a width of from about 1 to 3 inches and a thickness of from about 1/8 to 1/4 inch, said foam being characterized by having a density of from about 1 to about 10 pounds per cubic foot and a melting point such that it can be severed and fused with a heated cutting edge at a temperature of from about 250° F. to about 350° F., and a film of a pressure-sensitive adhesive material on one side of said strip to enable the strip to be adhered to and maintained on rigid structural members preparatory to forming a draft- and moisture-resistant joint between said rigid structural members with the insulating article, said film having a thickness of from about 0.1 to 0.5 mil and a tackiness and tensile strength such that the insulating article may be rolled upon itself thereby to place the film of pressure-sensitive adhesive material in contact with the opposite, non-adhesive film bearing side of the strip and unrolled without substantially adversely affecting the integrity of the film.

4. An insulating article in roll form comprising an elongated, flexible strip of a polyethylene foam, said strip having a width of from about 1 to 3 inches and a thickness of from about 1/8 to 1/4 inch, said foam being characterized by having a density of from about 1 to about 10 pounds per cubic foot and a melting point such that it can be severed and fused with an electrically heated cutting blade at a temperature of from about 250° F. to about 350° F., and an essentially continuous film of a pressure-sensitive adhesive material on at least one side of said strip extending longitudinally of the strip, said film being substantially medially positioned with respect to the longitudinal edges of said strip and having a width less than 50% of the width of the strip to provide adhesive-free marginal areas on the adhesive material carrying side of the strip, said film having a thickness of from about 1 to about 3 mils.

References Cited

UNITED STATES PATENTS

| | | | |
|---|---|---|---|
| 1,960,137 | 5/1934 | Brown | 206—59 X |
| 2,096,750 | 10/1937 | Lawrence. | |
| 2,249,424 | 7/1941 | Hanington. | |
| 2,292,024 | 8/1942 | Dreher. | |
| 2,367,536 | 1/1945 | Spitzli. | |
| 3,032,181 | 5/1962 | Hutter et al. | 206—59 |

JAMES B. MARBERT, *Primary Examiner.*

LOUIS G. MANCENE, *Assistant Examiner.*